(12) United States Patent
Compton

(10) Patent No.: US 7,274,521 B2
(45) Date of Patent: Sep. 25, 2007

(54) INTEGRAL SCREEN MAGNIFIER

(76) Inventor: David Compton, Lensvision, P.O. Box 817, Westbrook, ME (US) 04098

( * ) Notice: Subject to any disclaimer, the term of this patent is extended or adjusted under 35 U.S.C. 154(b) by 100 days.

(21) Appl. No.: 11/253,356

(22) Filed: Oct. 18, 2005

(65) Prior Publication Data

US 2006/0238899 A1  Oct. 26, 2006

Related U.S. Application Data

(60) Provisional application No. 60/620,559, filed on Oct. 20, 2004.

(51) Int. Cl.
*G02B 27/02* (2006.01)
*G02B 7/02* (2006.01)

(52) U.S. Cl. ........................ 359/802; 359/811

(58) Field of Classification Search ................ 359/802, 359/803, 804, 805, 811, 817
See application file for complete search history.

(56) References Cited

U.S. PATENT DOCUMENTS

| | | |
|---|---|---|
| 4,012,127 A | 3/1977 | Bolander |
| 4,451,117 A | 5/1984 | Goode |
| 4,991,935 A | 2/1991 | Sakurai |
| 5,130,853 A | 7/1992 | Sakurai |
| D336,909 S | 6/1993 | Sakurai |
| 5,325,278 A | 6/1994 | Tortola et al. |
| 5,615,768 A | 4/1997 | Schermerhorn |
| 6,067,459 A | 5/2000 | Lincoln et al. |
| 6,151,172 A | 11/2000 | Ferraro |
| 6,201,867 B1 | 3/2001 | Koike |
| 6,275,333 B1 | 8/2001 | Shaffer |
| 6,389,268 B1 | 5/2002 | Snyder |
| 2001/0051508 A1* | 12/2001 | Wang ........................ 455/90 |
| 2002/0037703 A1* | 3/2002 | Hirota et al. ............... 455/90 |

OTHER PUBLICATIONS

Screens "Cell Phone Magnifier Fits Most Cellphones", (no date), website http://www.seniorshops.com/cellmagnifier.html (2 pages).
Screens "Cell Phone Magnifier", (no date), http://stop.store.yahoo.com/phonemerchants/celphonmag.html (2 pages).
Screens "Cell Phone Magnifying Lens", (no date), http://www.thelowvisionstore.com/catalog/product_info.php?products_id=226 (2 pages).
Screens "MOTOROLA V60 V60I Speckled Black w/ Clear Oil Faceplate", (no date), http://www.cellularfactory.com/det.jsp?d=6020&c=2381 (4 pages).

* cited by examiner

*Primary Examiner*—David N. Spector
(74) *Attorney, Agent, or Firm*—Verrill Dana, LLP; Chris A. Caseiro; Brian J. Libby

(57) ABSTRACT

An integral screen magnifier for the display of a portable electronic device. The magnifier either is the display of a faceplate of the device or is integrally connected to the faceplate. The screen magnifier is arranged to provide effective magnification of text and graphics visible on the device without detractions from the overall shape or appearance of the device. The screen magnifier being integrated with the faceplate of the portable electronic device. Either the screen magnifier and the faceplate are one inseparable unit or the screen magnifier is separable from the faceplate.

7 Claims, 1 Drawing Sheet ically small display screens. The present invention is an integral screen magnifier.
INTEGRAL SCREEN MAGNIFIER

CROSS REFERENCE TO RELATED APPLICATION

The present application claims the priority benefit of U.S. provisional patent application Ser. No. 60/620,559, filed Oct. 20, 2004, entitled "INTEGRAL SCREEN MAGNIFIER" of the same named inventor. The entire contents of that prior application are incorporated herein by reference.

BACKGROUND OF THE INVENTION

1. Field of the Invention

The present invention relates to portable electronic devices. More particularly, the present invention relates to handheld devices including display screens. Still more particularly, the present invention relates to portable telecommunications devices, including cellular phones, having relatively small display screens. The present invention is an integral screen magnifier.

2. Description of the Prior Art

Portable electronic devices including a display screen for viewing text, graphics and video are of great usefulness and popularity. In addition to handheld electronic games used for entertainment, there are many telecommunications devices, such as radiotelephones (e.g., cellular telephones) and pagers that are used for commercial and personal purposes. For many of these devices, one goal for manufacturers has generally been to make them lighter for ease of handling. Another goal has been to make them more powerful and able to run increasingly sophisticated programs. As a result, they continue to undergo miniaturization while also providing more information for the user to view on the display screen. There is therefore a tendency for the information visible on the screen to be smaller in size and of greater density than was visible in earlier portable electronic devices, and certainly smaller than is available on stationary display devices, such as personal computer monitors, for example.

The size of the text and graphics visible on the display of a portable electronic device makes it difficult for many people to view that material easily. As a result, considerable attention must be focused on the display in order to see the information, which focus may distract the person from other matters requiring attention, such as driving a vehicle. Further, for some people, it may simply be too difficult to view the information. These people may decline the opportunity to acquire portable electronic devices for that reason.

While many may currently be excluded from using portable devices, cellular phones in particular remain widely popular; they are used by many millions of people worldwide. Increasingly, cellular phones can be used for more than just voice communications. They are also used to access the internet, obtain navigation instructions, take still pictures, view streaming video, and will likely be used for other applications in which viewing of the display screen is essential. Relatedly, for those with vision deficiencies, the United States Telecommunications Act of 1996, Section 255, requires manufacturers to ensure that the telecommunications equipment they produce to be accessible to, and usable by, individuals with disabilities, if readily achievable. It is unclear whether that requirement has translated into telecommunications products, such as cellular phones and pagers, that provide effective accessibility for those individuals with disabilities, particularly for those with restricted vision.

Apart from the urgings of Section 255 of the Telecommunications Act of 1996, some attempts have been made generally to enable people to view information on small electronic display screens, including cellular phone displays. For example, there are magnifying lenses that may be clipped on the electronic device and positioned over the display. There are also magnifying pads that may be affixed on the surface of the display. Some cellular phones come with stacked lenses that may be spaced apart using a dial in order to generate magnification. All three types of existing viewing-assist devices have their limitations. The clip-on lens adds substantial bulk to the device and can easily be displaced or fall off under typical usage conditions, such as when the device is bumped, dropped, etc. The magnifying pads also add bulk and may also be displaced or fall off when the device is used. The stacked lenses are relatively complex, may shift after positioning, and add to the expense of the device.

Therefore, what is needed is a magnifying element for the displays of portable electronic devices, such as cellular phones, that will remain substantially in position and function as intended under typical device handling conditions. What is also needed is a magnifying element for portable electronic device displays that will provide effective magnification of the display without detracting from the overall shape or appearance of the device. Further, what is needed is such a magnifying element that may be manufactured and joined to the portable electronic device relatively inexpensively.

SUMMARY OF THE INVENTION

It is an object of the present invention to provide a magnifying element for the displays of portable electronic devices, which magnifying element will remain substantially in position and function as intended under typical device handling conditions. It is also an object of the present invention to provide a magnifying element for portable electronic device displays that will provide effective magnification of the display without detracting from the overall shape or appearance of the device. Further, it is an object of the present invention to provide such a magnifying element that may be manufactured and joined to the portable electronic device relatively inexpensively.

These and other objects are achieved with the present invention, which is an integral magnifier lens for portable electronic devices, including cellular phones in particular. The lens is integrated into a faceplate, cover, or similar device used to prevent direct contact of external conditions with the Liquid Crystal Display (LCD) or other generated display means. The magnifying lens cover of the present invention replaces the standard transparent covering that is currently employed, rather than attaching magnifying devices to that standard transparent. The magnifying lens cover is fabricated of a transparent material including, for example, glass, a rigid viscoelastic material, or a flexible viscoelastic material.

The details of one or more examples related to the invention are set forth in the accompanying drawings and the description below. Other features, objects, and advantages of the invention will be apparent from the description and the drawings.

DETAILED DESCRIPTION OF THE PREFERRED EMBODIMENT

Figure 1:
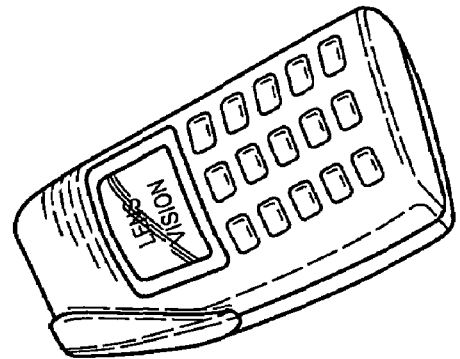
FIG. 1 is a perspective view of a prior art cellular phone with a standard faceplate and display cover, showing a representative relative size of the text displayed thereon.

FIG. 1 is a simplified depiction of a cellular phone of the prior art, showing the phone faceplate including a display cover. The display cover is a transparent piece of glass or plastic that allows viewing of text, graphics, etc, on a digital or liquid crystal display thereunder. The prior art cellular phone shown in FIG. 1 includes a representation of the text visible under the display cover. The size of the text shown in FIG. 1 was selected for ease of reading comparison to the magnification provided by the present invention. It is not intended to represent the actual size of the information displayed on any particular manufacturer's cellular phone.

Figure 3:
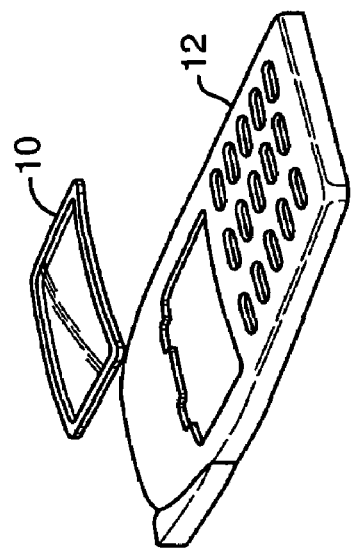
FIG. 3 is a perspective view of a cellular phone faceplate with the magnifying cover of the present invention shown spaced therefrom.
Figure 2:
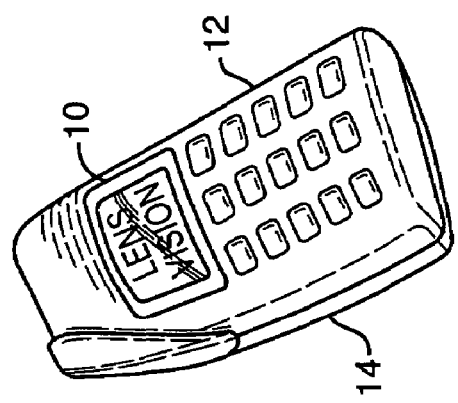
FIG. 2 is a perspective view of a cellular phone with the magnifying cover of the present invention, and showing the same text of FIG. 1 in relatively larger size as magnified.

In reference to FIGS. 2 and 3, a magnifying cover 10 of the present invention is shown forming an integral portion of a faceplate 12 of a cellular phone 14. The magnifying cover 10 is transparent and preferably magnifies visual representations thereunder at a magnitude of 1.5×-10×, and more preferably at 2×. As shown in FIG. 2, the magnifying cover 10 is arranged to fit within the profile of existing faceplates such as faceplate 12, while magnifying the text or graphics displayed on the display produced on the cellular phone, or any other portable electronic device having a relatively small display. Specifically, the representation of the same text shown in FIG. 1 is shown in FIG. 2 magnified by 2× by the magnifying cover 10 of the present invention.

The magnifying cover 10 is fabricated of any material that is transparent and capable of producing magnification. Preferably, the magnifying cover 10 is fabricated of a nonmetallic material, such as plastic. More preferably, the plastic material is selected from the group consisting of polymethylmethacrylate (acrylic), polycarbonate, and polystyrene. Still more preferably, the magnifying cover 10 is fabricated of a plastic optic material, such as is made available by G-S Plastic Optics of Rochester, N.Y. The plastic optic material may be fabricated aspherically more easily than glass and therefore is less costly to shape into a lens that magnifies at a selectable magnification. The magnifying cover 10 is formed to a shape that substantially conforms with the curvature of the faceplate 12. While it may be possible to form the magnifying cover 10 integrally with the fabrication of the faceplate 12, it is contemplated that the magnifying cover 10 is fabricated separately and then fitted into a retaining frame on the underside of the faceplate 12.

It is to be understood that the magnifying cover 10 may form an integral portion of faceplates, covers, and the like of other portable electronic devices including, for example, pagers and handheld gaming devices. This detailed description is not intended to limit the principle concept of the present invention as an integral magnifying element intended to aid individuals see information on portable electronic display screens with greater clarity. All equivalents are deemed to fall within the scope of this description of the invention.

What is claimed is:

1. A screen magnifier for portable electronic devices having a display comprising:
   a. a base faceplate affixable to a portable electronic device; and
   b. a transparent glass magnifying material integrated with the faceplate.

2. The magnifier of claim 1 wherein the transparent magnifying material and the faceplate are one inseparable unit.

3. The magnifier of claim 2 wherein the transparent magnifying material magnifies at a magnitude of between about 1.5×-10×.

4. The magnifier of claim 3 wherein the transparent magnifying material magnifies at a magnitude of about 2×.

5. The magnifier of claim 1 wherein the transparent magnifying material is removable from the faceplate.

6. The magnifier of claim 5 wherein the transparent magnifying material magnifies at a magnitude of 1.5×-10×.

7. The magnifier of claim 6 wherein the transparent magnifying material magnifies at a magnitude of about 2×.

* * * * *